Oct. 13, 1953  J. GREAVES  2,654,917
STORAGE BIN
Filed May 9, 1951  4 Sheets-Sheet 2
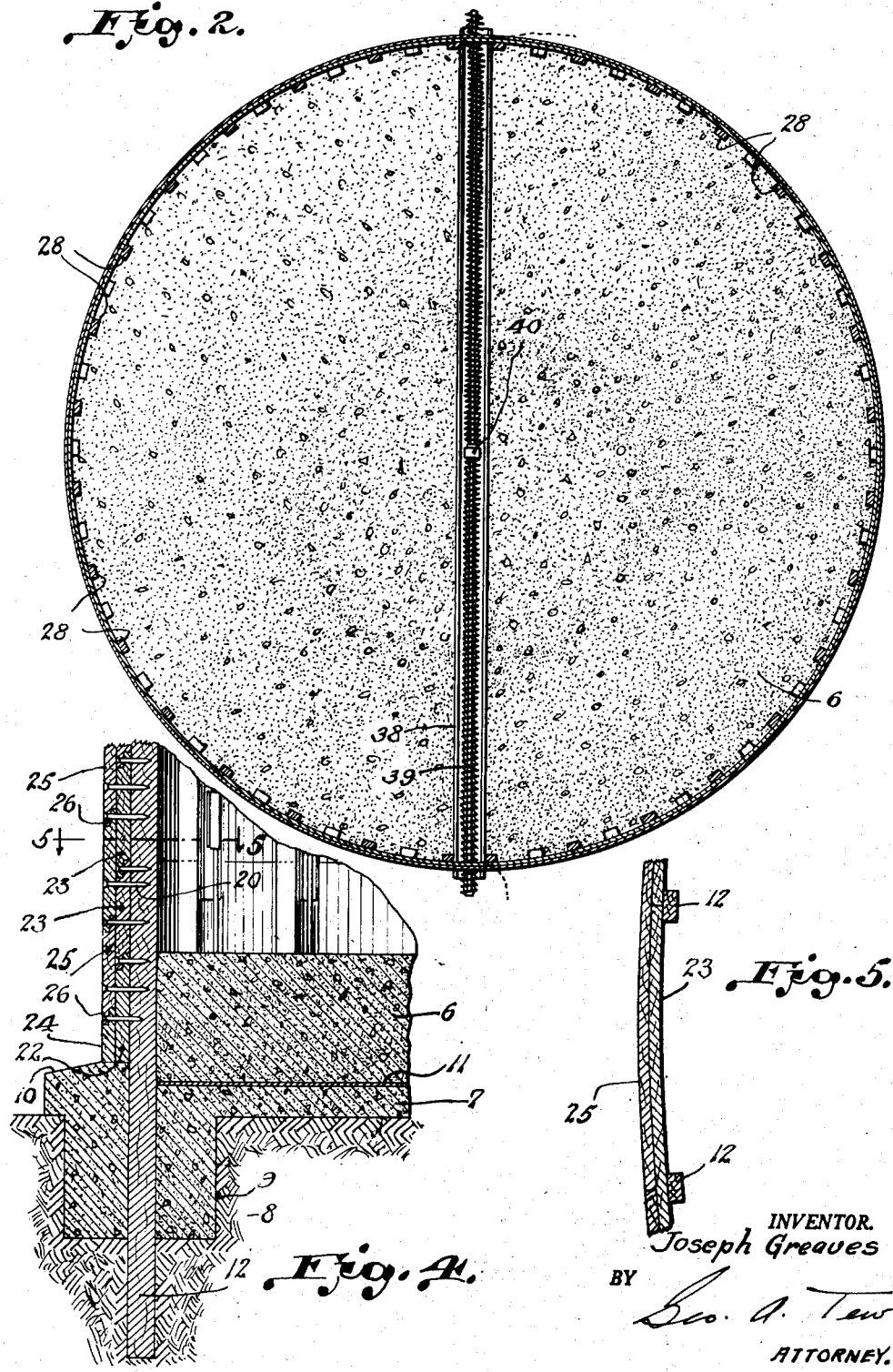
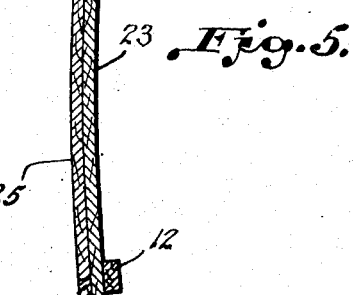
INVENTOR.
Joseph Greaves
BY
ATTORNEY.

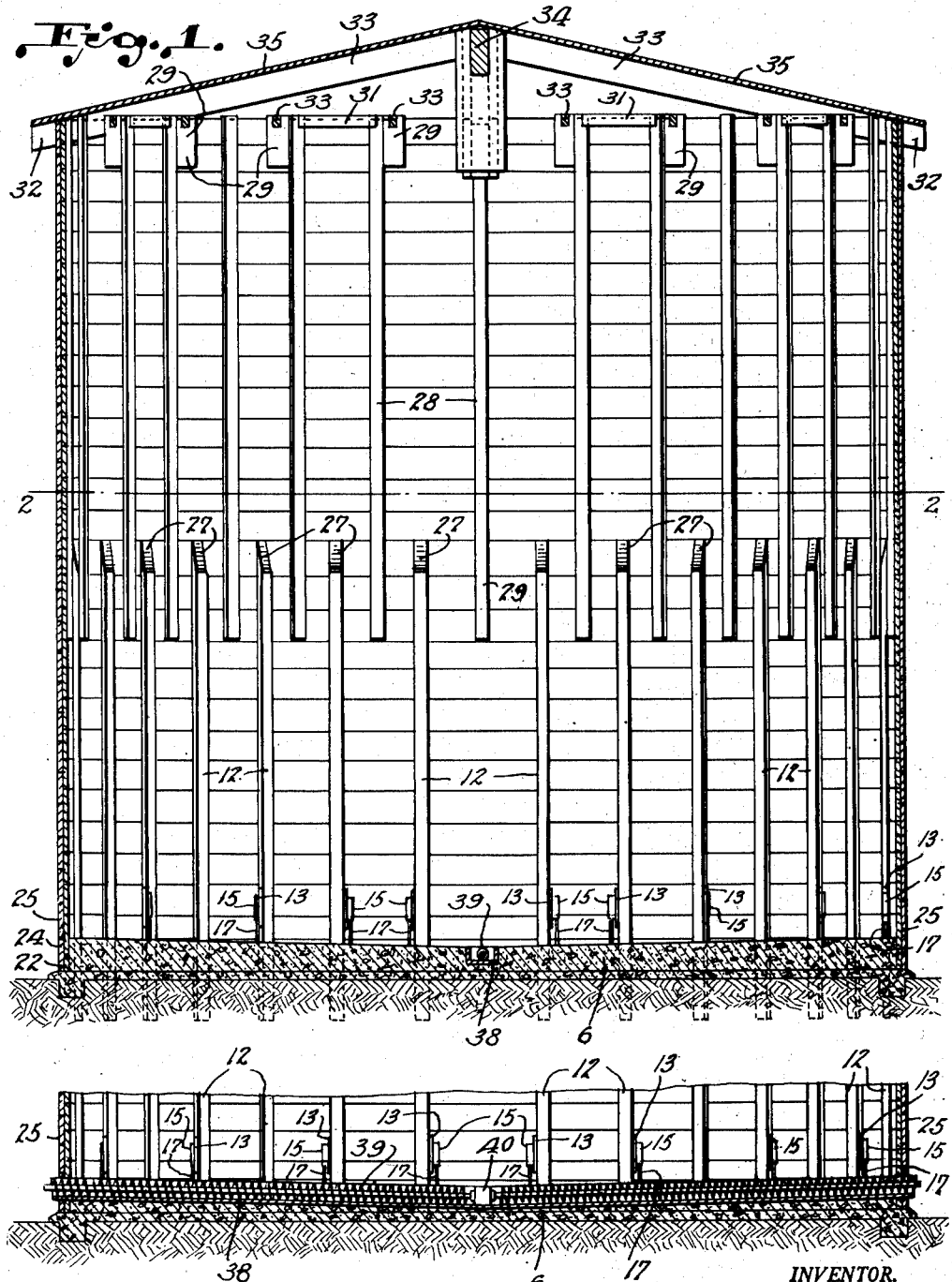

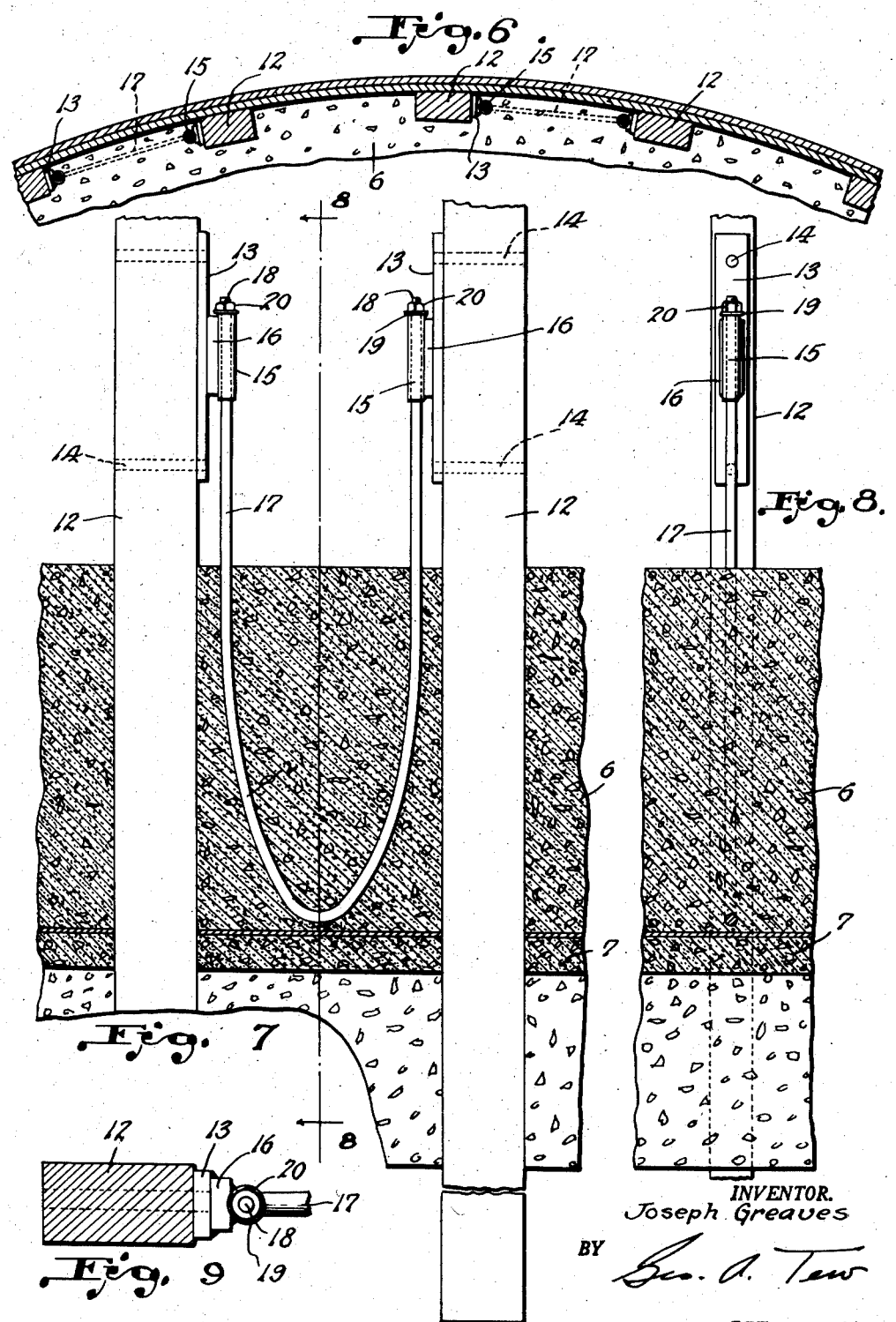

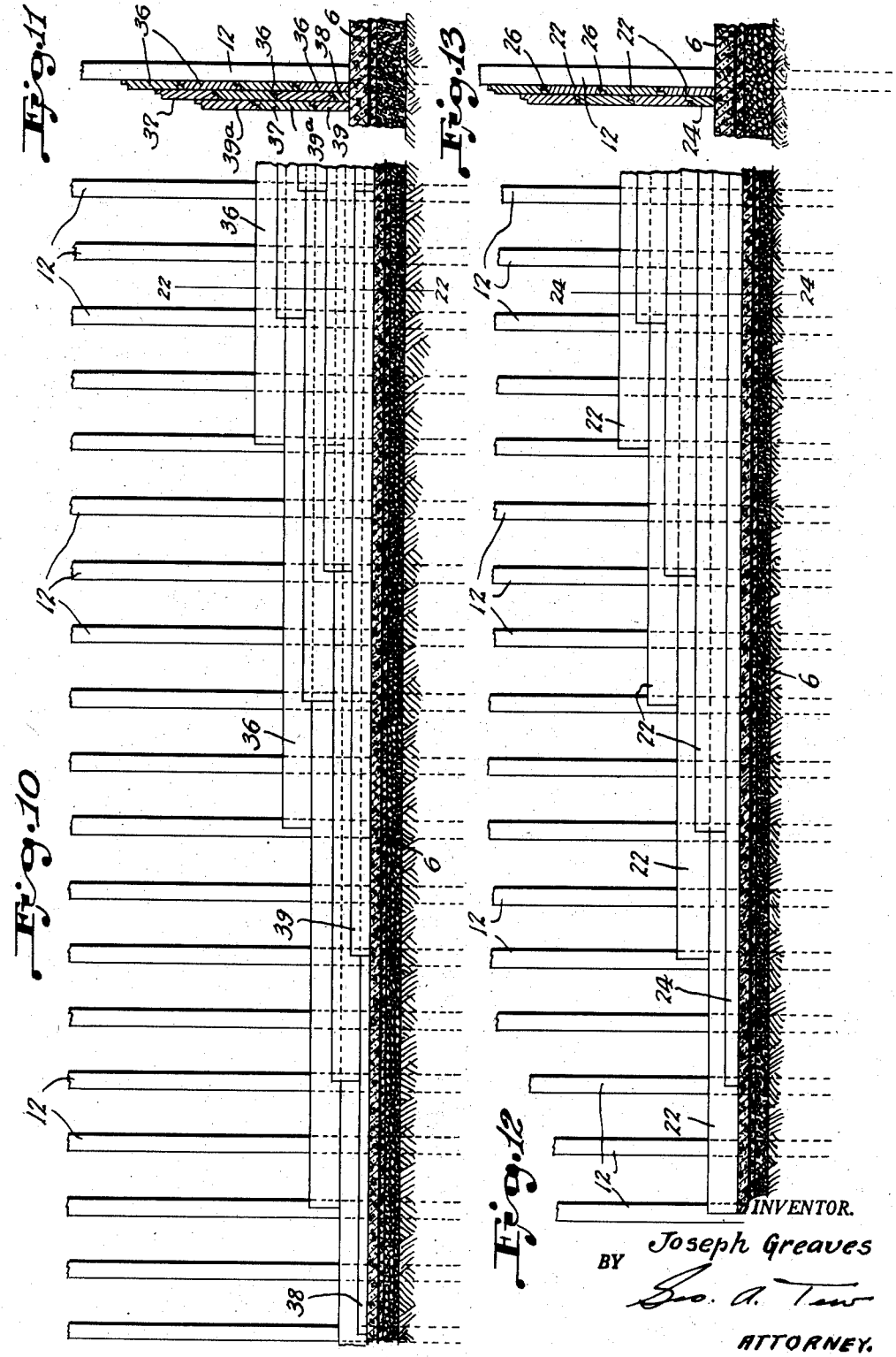

Patented Oct. 13, 1953

2,654,917

UNITED STATES PATENT OFFICE 2,654,917

STORAGE BIN

Joseph Greaves, Toston, Mont.

Application May 9, 1951, Serial No. 225,315

3 Claims. (Cl. 20—1.2)

This invention relates primarily to a circular type storage bin, which bins are more particularly used for the storage of grain or other bulky material. The bin is preferably constructed substantially entirely of wood and the same is erected in such a manner as to make the same strong, durable and long lasting.

The main object of the invention is to construct a storage bin or building having the walls or sides thereof in the form of a circle, the sides being composed of a plurality of layers of siding boards which are superimposed upon each other, which thereby provides a bin of extreme strength.

Another object of the invention is to secure the superimposed siding boards to vertically circularly arranged studdings which extend from the bin base, as by starting the respective siding boards at every other studding so that no two joints of the respective boards will meet at the same place on any of the studdings.

A further object provides laying the superimposed siding in a horizontal plane around the bin, which, utilizes the tensile strength of the wood of the siding boards, such tensile strength of the wood being utilized because pressure from within the bin against the inner layer of siding boards tends to pull the same lengthwise thereof, which, in consequence thereof, the tensile strength of the wood in the siding boards is utilized to thereby strengthen the bin.

These bins of the invention are generally erected from some forty feet to sixty feet in height and have a diameter of from twenty-two to forty feet and the invention uses only ship lap siding for the sides of the bin, that is a siding having overlapping edges, the lower type or the forty foot high bins having preferably two layers of shiplap siding sheets applied thereto, while the higher, or sixty foot bins have three superimposed layers of such shiplap siding, which siding boards of course form the outer walls of the bins.

A further object of the invention provides the respective upright studdings to which the shiplap siding boards are nailed, to be embedded in the ground at their lower ends and further having their lower portions embedded within the concrete which goes to make up the base of the bin.

A further object of the invention provides a U-shaped bolt which, in the form of the invention shown in Figs. 1 to 5, is adapted to be attached as between every other pair of studs to brackets mounted on the inner edges of the studdings just above the concrete base, whereby the lower ends of the brackets are embedded within the concrete base for purposes of strength.

Another object as seen in the modified form shows an opening at the center of the base, which opening leads to the auger box or screw conveyor, the opening being closed by a slidable cover plate operable by a lever pivotally mounted at the outer side of the bin to admit grain within the bin to descend to the grain auger or conveyor.

A further object provides a particular type gage which is used to place the respective studdings at an equal distance from the center of the bin and in a true perpendicular arrangement.

The invention is illustrated in the accompanying drawings in which:

Fig. 1 is a vertical sectional view through the center of the bin and looking into the interior thereof;

Fig. 2 is a horizontal section taken on the line 2—2 of Fig. 1;

Fig. 3 is a partial vertical sectional view taken through the base of the bin of the form of Fig. 1;

Fig. 4 is an enlarged view in section of a portion of one side of the base and the lower side of the bin;

Fig. 5 is a section taken on the line 5—5 of Fig. 4;

Fig. 6 is an enlarged horizontal sectional view of a portion of a segment of the bin side, and looking down thereon and showing the U-bolt arrangement between every other pair of studs;

Fig. 7 is an enlarged view in section of two of the studs and showing the manner in which the U-bolts are fixed to the studdings and having the lower end thereof embedded in the concrete base of the form of the invention shown in Fig. 1;

Fig. 8 is a section taken on the line 8—8 of Fig. 7;

Fig. 9 is an enlarged detail of one of the U-bolt supporting brackets;

Fig. 10 is an enlarged view of a portion of the side of the bin showing the manner in which three layers of shiplap siding boards are ar- Fig. 11 is a sectional view on the line 22—22 of Fig. 21;

Fig. 12 is an enlarged view of a portion of the side of the bin showing the manner in which two layers of shiplap siding are arranged;

Fig. 13 is a sectional view taken on the line 24—24 of Fig. 23.

Referring specifically to the drawings in which like numerals are used to designate similar parts throughout the various views, and referring more specifically to the construction of the storage bin shown in Figs. 1 to 5, the bin is shown as consisting of a concrete base preferably of two concrete layers, that is, an upper layer designated 6 and a lower layer designated 7, the lower layer 7 being provided with a circumferential downwardly extending flange portion 8, which portion of the lower base lies within a circular trench 9, which trench 9 has been dug prior to the pouring of the lower layer of the base. The upper flange of the lower base layer which lies outside of the wall of the bin is sloped downwardly as seen at 10 so that water running down the sides of the bin will drain away from the base thereof. After the lower layer 7 has been poured and set up, the upper layer 6 is poured, but prior to this a sheet or layer of waterproof roofing paper 11, such as the well known tar paper is laid over the lower layer of the base, such paper serving the purpose of preventing moisture from seeping up through the concrete and thereby keeping the inner or upper surface of the layer 6 in a dry condition.

The wall of the bin includes a plurality of circumferentially arranged and equally spaced vertical 2" x 4" studs 12, which are properly spaced as by gage devices later to be described. The lower ends of the studdings are set in the holes which are dug into the ground to a depth of twenty-six inches. After the studs 12 have thus been placed in their proper relation and after being plumbed, the lower layer 7 of the concrete base is poured whereby the studs are anchored within the concrete base at their lower ends.

However, before the studs 12 are finally put into place, on every other adjacent pair thereof, throughout the entire circumference of the bin, are placed on the inner facing surfaces thereof a bracket or plate 13 which is preferably bolted to the narrow sides of the studs as by bolts 14, the plates 13 having secured thereto a socket member 15 as by a web 16. The socket member is of course hollow and is adapted to receive the upper end of a U-shaped bolt 17, that is, each of the socket members on two adjacent studdings receive the upper ends of the U-shaped bolts 17. The upper ends of the U-bolts 17 are threaded as at 18 to receive a washer 19 and nut 20 to support the U-bolt in bolted position to the studdings. Thereafter, when the upper layer 6 of the concrete base is poured the lower portions 21 of the U-shaped bolt is embedded in the concrete to add strength to the base of the bin.

The side of the bin comprises two layers of shiplap siding, the said siding being one inch thick by eight inches wide by sixteen feet long, the said siding being applied as best seen in Fig. 4, wherein the lowermost board of the inner layer is designated 22 and the next adjacent shiplap siding designated 23, all of the inner layer of shiplap siding being of an eight inch width. Now the siding board 24 of the lowermost outside layer is only five inches in width and all succeeding siding boards 25 are of the usual eight inch width and in having the lowermost siding board 24 but five inches in width it will be seen that all of the joints indicated at 26 will be spaced laterally with respect to each other and no two joints will fall in the same line, so to speak.

The studdings 12 are extended upwardly and have their upper ends beveled off as at 27 to prevent any grain from lodging on the tops of the studdings. The shiplap siding boards are nailed to the studdings 12 as by nails 20 upwardly of their entire length, being nailed from the outside to the studdings, and after the layers of siding have been nailed up to the tops of the first length of studdings 12. Thereafter, a second length of studdings shown at 28 have their lower ends 29 overlapping three rows of the shiplap siding to which they are nailed in positions intermediate the studdings 12 and from then on the shiplap siding is nailed to the upper studdings 28 to their full lengths. Every other pair of studdings 28 at their upper extremities have attached thereto wooden plates 29 which are provided with recesses or cut-out portions 30, the respective pairs of studding 28 being bridged by a plate 31 secured thereto at its opposite ends. The recesses 30 are adapted to receive the end portions 32 of slanting rafters 33, which rafters are of the usual construction of the type used in supporting roofs. The inner ends of the rafters are spiked to a medial supporting beam 34 which extends through the middle diameter of the bin. A bin roof 35 of wood is applied to the rafters in a known manner and slope from the upper beam 34 toward the respective opposite sides of the bin.

Referring more particularly to Figs. 10 to 13 inclusive, will depict the manner in which the shiplap siding is laid, and Figs. 10 and 11 show the method and manner of laying a bin having three superimposed layers of shiplap siding. Thus, referring to the innermost layer, the siding boards 36 are each one inch thick, eight inches wide and sixteen feet long. In the middle layer of the shiplap boards it will be seen that the lowermost board 38 of this layer is but two and one-half inches wide, the next succeeding boards 37 of this layer being of the usual eight inch width, while the lowermost board 39 of the outer layer is five and one-half inches in width, the next succeeding board 39ª being the usual eight inch width. Therefore, it will be seen that when the shiplap siding is laid as shown in Fig. 11 that none of the interengaging edges of the respective layers are in alignment, in other words they are all out of alignment which provides for the prevention of possible water leakage at the joints in addition to strengthening the bin sides.

It will readily be understood that the sides of the bin are made from a plurality of vertically arranged courses of superimposed siding boards with the face portions of the boards of the respective layers lying in close fitting frictional or rubbing contact with the next succeeding layers. Thus, referring specifically to Figs. 10 and 11, it will be noted that the inner faces of the respective boards 37 and 38 are in tight frictional contact with the outer surfaces of the inner layer of boards 36, and further that the inner surfaces of the boards 39 and 39ª are in flat frictional contact with the outer surfaces of the intermediate boards 37 and 38. Likewise, in Fig. 13, the outer surfaces of the boards 22 are in flat frictional contact with the inner surfaces of the boards 24 and of each succeeding vertically spaced horizontal layer of siding boards. The described superimposed layers of the siding boards are very important to the strength of the bin, because, it can readily be seen that if a bin be filled with grain, for example, then, the extreme pressure which is naturally exerted outwardly on the layers of the innermost siding boards would tend to "bulge" or spread the same outwardly, but this is prevented, because, when such a condition arises the friction between the respective layers of siding boards comes into play and such friction between the boards increases as the inner pressure increases, whereby the greater the pressure from within the bin, the greater the pressure that is created between the flat friction sides of the boards, which tends to increase the strength of the bin sides, and the only way in which the bin side could burst or be destroyed would be for the siding boards to break in half or rupture in a vertical plane or further for the nailed ends of the siding boards to pull horizontally away from the nails, but this is practically impossible because of the friction created between the respective boards and further because the longitudinal tensile strength of each siding board is being utilized in the horizontal pull directed to the boards as a consequence of the high pressure within the bin and again the friction between the respective layers is greatly increased to withstand any pressure from within the bin. It will further be noted that the siding boards forming the bin sides are attached to only the outer faces of the vertical studs, and this is important, because if the siding boards were attached say to the inner faces of the vertical studs, then, the extreme pressure within the bin when filled with grain would be transmitted from the sides almost directly to the vertical studs and therefore the vertical studs of such a construction would have to be much stronger than if, as in the application, the sides are attached to only the outer faces of the studs, which, when pressure is applied from within against the sides of the bin creates only a pulling action against the studs, which pulling action is counteracted by the friction created between the various layers of siding boards.

In the two layer construction of Figs. 12 and 13, and shown also in Fig. 4, and heretofore referred to, the innermost boards 22 are all eight inches in width, while the lower board 24 of the outermost layer is but five and one-half inches in width, and when laid as shown all of the joints as seen at 26 are out of alignment for the purpose heretofore described. Therefore I have devised a unique method of laying the shiplap siding so that the joints along the joining edges of the boards are broken.

The concrete base of the bin is provided with a channel-shaped auger box 38 extending diametrically across one diameter of the bin into which is mounted a screw type auger 39 supported at its center in a fixed bearing 40 and the auger can be driven by motors (not shown) near the ends of each section of auger, the respective ends of the auger extending outwardly through the side of the bin.

After the studdings have been set in a true circle the next step is to apply to the studdings two or three layers of the shiplap to about the width of four boards high. Next put a light cable, having two or three turnbuckles fitted at spaced points within the same, around the studdings just above the upper layer of shiplap and then draw it up tight and from time to time work it up as the shiplap is progressively applied. This keeps the studding from getting out of line.

The next step is to dig the trench 9 to a width of one foot inside the studs and one foot outside of the studs, of course digging the ground out between the studs. Next, the U-bolts 17 are applied to the brackets 16, which brackets have been applied to the studs 12 prior to their being set.

The next step is to pour the concrete base in the trench 9 and building it up to a distance at the edges of about the height of two or three shiplap boards, being sure to slope the base outwardly as seen in Fig. 1. The trench 9 is filled first with concrete and let set before the interior base of the bin is poured. When the upper layer 6 of the concrete base is poured it envelops the portions of the studs 12 just above the lower concrete layer and also surrounds the U-shaped bolt braces which are finally embedded therein for a distance just below the supporting brackets 13.

Of course during the pouring of the lower base layer a form can be built to define the outer side of the bin base.

The invention has been illustrated in preferred embodiments but is not intended that the same should be limited thereto, but is capable of modification and variation within the scope of the following claims.

The merits of this bin is that it employs the tensile strength of wood which is very important, and further the bin is constructed entirely of wood, the siding being of wood which turns rain or water better than metal which latter condenses moisture and causes mould.

What I claim is:

1. A grain storage bin comprising a concrete base, vertical studs mounted in and extending above the base, said studs being placed in a true circle, said bin including a wall consisting of at least two superimposed layers of siding boards, each layer of siding boards comprising a plurality of siding boards placed horizontally around and attached to the outer surfaces of the studs, the longitudinal joints of the boards in one layer being in staggered relation to the longitudinal joints of the boards in the next adjacent layer, and the ends of abutting boards of one layer being staggered vertically in respect to the ends of the boards of the adjacent layer.

2. A grain storage bin comprising a concrete base, vertical studs mounted in and extending above the base, anchor bolts comprising end portions, each end portion thereof being secured to a stud, said anchor bolts extending downwardly from said end portions and having a loop portion, the loop portion being imbedded in the concrete base, said studs and anchor bolts being placed in a true circle, said bin including a wall consisting of at least two superimposed layers of siding boards, each layer of siding boards comprising a plurality of siding boards placed horizontally around and attached to the outer surfaces of the studs, the longitudinal joints of the boards in one layer being in staggered relation to the longitudinal joints of the boards in the next adjacent layer, and the ends of abutting boards of one layer being staggered vertically in respect to the ends of the boards of the adjacent layer.

3. A grain storage bin comprising a concrete base, vertical studs mounted in and extending above the base, said studs being placed in a true circle, said bin including a wall consisting of at least two layers of siding boards, each layer of siding boards comprising a plurality of siding boards placed horizontally around and attached to the outer faces of the studs, the outer surface of the inner layer of the siding boards being in frictional contact with the inner surface of the outer layer of siding boards, the longitudinal joints of the boards in one layer being in staggered relation to the longitudinal joints of the next adjacent layer, and the ends of the abutting boards of one layer being staggered vertically in respect to the ends of the boards of the adjacent layer.

JOSEPH GREAVES.

References Cited in the file of this patent

UNITED STATES PATENTS

| Number | Name | Date |
|---|---|---|
| 726,649 | Craine | Apr. 28, 1903 |
| 762,564 | Turner | June 14, 1904 |
| 996,262 | Kurtz | June 27, 1911 |
| 1,157,158 | Harry | Oct. 19, 1915 |
| 1,247,958 | Holmes | Nov. 27, 1917 |
| 1,418,216 | Vorse | May 30, 1922 |
| 1,572,589 | Anderson | Feb. 9, 1926 |
| 1,969,014 | Karp | Aug. 7, 1934 |
| 2,098,485 | Carlson | Nov. 9, 1937 |

FOREIGN PATENTS

| Number | Country | Date |
|---|---|---|
| 206,765 | Great Britain | of 1923 |

OTHER REFERENCES

U. S. Dept. of Agriculture Farmers Bulletin 469, September 1911, pages 19–23.